US010703615B2

(12) United States Patent
Baas (10) Patent No.: US 10,703,615 B2
(45) Date of Patent: Jul. 7, 2020

(54) MODULAR RECOVERY SYSTEM

(71) Applicant: JPM BEHEER B.V., Lisse (NL)

(72) Inventor: Fred Baas, Nieuw-Vennep (NL)

(73) Assignee: JPM BEHEER B.V., Lisse (NL)

( * ) Notice: Subject to any disclaimer, the term of this patent is extended or adjusted under 35 U.S.C. 154(b) by 400 days.

(21) Appl. No.: 15/579,448

(22) PCT Filed: Jun. 6, 2016

(86) PCT No.: PCT/NL2016/050406
§ 371 (c)(1),
(2) Date: Apr. 12, 2018

(87) PCT Pub. No.: WO2016/195501
PCT Pub. Date: Dec. 8, 2016

(65) Prior Publication Data
US 2018/0141792 A1    May 24, 2018

(30) Foreign Application Priority Data

Jun. 5, 2015 (NL) ..................................... 2014930

(51) Int. Cl.
*B66F 3/35* (2006.01)
*B66F 7/08* (2006.01)
*B64F 5/00* (2017.01)

(52) U.S. Cl.
CPC ................ *B66F 3/35* (2013.01); *B66F 7/085* (2013.01); *B64F 5/00* (2013.01)

(58) Field of Classification Search
CPC ...... B66F 3/24; B66F 3/25; B66F 3/35; B66F 3/36; B66F 3/40; B66F 3/46; B66F 3/247; B64F 5/00; Y10T 403/54; Y10T 403/32016; Y10T 403/32081; Y10T 403/32549
USPC ..................................... 254/93 HP
See application file for complete search history.

(56) References Cited

FOREIGN PATENT DOCUMENTS

| DE | 10201300296 A1 | 8/2014 | |
|---|---|---|---|
| FR | 2519955 A2 * | 7/1983 | ............. F15B 15/10 |
| JP | 2004149248 A * | 5/2004 | |

* cited by examiner

*Primary Examiner* — Monica S Carter
*Assistant Examiner* — Alberto Saenz
(74) *Attorney, Agent, or Firm* — Perry + Currier Inc.

(57) ABSTRACT

A modular salvage system includes first and second inflatable lifting cushions, a connecting collar on an upper side and underside and between each successive lifting cushion for enclosing the inflatable lifting cushion. The connecting collar is provided on a peripheral side with attachment points pivotally connectable to first and second radial shackles. The first radial shackle is pivotally connectable to the connecting collar and the other connecting collar includes a coupling segment that is pivotally connectable to a second radial shackle of an uppermost connecting collar. Each coupling segment is connectable in an axial direction to a subsequent uppermost coupling segment by an axial shackle. The axial shackle includes first and second bending-resistant segments between which a flexible segment extends. The tensile strengths of the bending-resistant segments and the flexible segment are substantially equal. Additionally, a related lifting module, container, and method for assembling are provided.

23 Claims, 9 Drawing Sheets

MODULAR RECOVERY SYSTEM

The present invention relates to a modular salvage system, in particular an aircraft lifting system, for erecting a stack of expandable lifting cushions alternating with form-retaining connecting collars located therebetween, wherein each of the lifting cushions is enclosed between opposite connecting collars. The present invention also relates to a lifting module as can be applied in such a modular salvage system, and to a container comprising at least one such lifting module.

A modular salvage system as referred to in the preamble is usually applied in salvaging stranded aircraft. A stranded aircraft is an aircraft which cannot stand independently in a normal orientation on the ground, or cannot be moved in usual manner under its own power or by means of a towing vehicle. This can occur because an aircraft has a defective or missing landing gear or because the aircraft has overshot the takeoff or landing runway. This happens an average of twice a week around the world; in many cases with the result of a partial or complete blockage of an airport. Salvage of such stranded aircraft generally takes much time and has serious economic consequences for the affected airport due to delays, cancellations and/or rerouting of flights. It is therefore of great importance to be able to quickly begin an effective salvage of a stranded aircraft in order to limit as far as possible the economic damage, but also technical damage to the stranded aircraft.

A problem however in salvaging aircraft is that, because of the wide diversity of aircraft, an aircraft salvaging unit at an airport must have at its disposal a similar diversity of salvaging material in order to thus be able to lift, stabilize and salvage any possible type of aircraft. A height, weight, wing orientation and other factors have a great influence on the possible deployment of a salvage system. It is known to apply a series of individually inflatable low-pressure cushions placed on top of one another when raising an aircraft. A number of usually rectangular inflatable cushions are attached one above another here and inflated using compressed air under a part of the defective aircraft to be raised. Although this known aircraft lifting system is particularly able to lift symmetrical loads to a certain lifting height, it also has a number of drawbacks. In particular, a considerable floor area is required for positioning such low-pressure cushions under an aircraft to be lifted so that sufficient stability results to prevent outward bending of the series of low-pressure cushions.

In addition, such low-pressure cushions are not very suitable for modular deployment. This means that a different type of salvage system has to be available for every class of aircraft which can use an airport. Particularly the specific maximum lifting heights, width dimensions and lifting capacities for different aircraft result in an airport having to have available and maintain various salvage systems or being dependent on salvage material flown in in the case of an incident. This latter can be particularly problematic when an airport has only a single runway which is wholly or largely blocked as a result of the incident in question.

During a salvage operation the angle of the aircraft relative to the horizon can moreover change, whereby the angle at which the salvage system engages on the aircraft component being lifted also changes. It is important in the case of typical low-pressure cushions to transfer the lifting force as vertically as possible to the aircraft component in order to prevent outward bending of the stack of cushions. When there is a change in the angle of engagement, it is therefore frequently the case that a repeated repositioning of the lifting system has to take place during lifting of an aircraft. The lifting angle can change significantly particularly in the case of a pronounced V-shaped wing orientation. This repeated repositioning results in a longer salvage time and also requires a stable ground surface at all locations where the lifting system has to be placed or repositioned.

The present invention has for its object, among others, to provide a modular salvage system which obviates at least one of the stated drawbacks to at least significant extent.

In order to achieve the stated object a modular salvage system according to the invention has the feature that a set of radial shackles is pivotally connectable with proximal outer ends in axial direction to respectively a first and a second of the opposite connecting collars, that the shackles of the set of radial shackles are pivotally connectable to each other at a distal outer end and that distal outer ends of successive sets of shackles in axial direction are mutually connectable by an axial shackle, wherein the radial shackles are substantially form-retaining and the axial shackles are respectively extendable and foldable at least in axial direction between a compressed and expanded state.

A particular embodiment of the salvage system according to the invention, comprising a first and at least a second inflatable lifting cushion with a connecting collar on an upper side and underside as well as between the lifting cushions for the purpose of accommodating a lifting cushion in enclosing manner between a set of opposite connecting collars, has the feature that a connecting collar is provided on a peripheral side with attachment points which are pivotally connectable to the first and the second radial shackle, that the first radial shackle is pivotally connectable on the one hand to a lower of the set of connecting collars and on the other comprises a coupling segment which is pivotally connectable to the second radial shackle, which second radial shackle is pivotally connectable to an uppermost of the set of connecting collars, wherein each coupling segment is connectable in axial direction to a subsequent uppermost coupling segment by means of an axial shackle, and that the axial shackle comprises a first and second bending-resistant segment between which a flexible segment extends.

The modular salvage system comprises a number of lifting cushions. These lifting cushions are preferably substantially identical in order to enhance the modular character of the system, but can optionally also differ in shape and/or size relative to each other. In a preferred embodiment according to the invention the lifting cushions are substantially circular in top view and, in inflated state, circular or elliptical in side view.

According to the invention the lifting cushions lie enclosed between connecting collars. A connecting collar is first of all arranged on a ground surface, a lifting cushion is then arranged thereon and another connecting collar is then arranged and so on until the lifting cushions form a vertical column of alternating connecting collars and lifting cushions of a sufficient height. The column is closed with an (end) connecting collar, on top of which further modules, elements or assemblies can optionally be provided.

The connecting collars enclosing the diverse lifting cushions are mutually connected with radial shackles. These radial shackles are pivotally connected on the one hand to the connecting collars in order to form, in side view, a substantially zigzag pattern of radial shackles. The distal sections of each set of radial shackles at the remote from the connecting collars each comprise a coupling segment. The radial shackles are attached to pivoting attachment points on the periphery of the connecting collars and, by aligning these attachment points, the coupling segments are also aligned with each other per series of coupling segments lying one above another. The coupling segments thus lie in sets aligned above each other. These sets of coupling segments lying one above another are connected to each other by means of axial shackles. This provides a significant increase in stability of the column in axial direction, i.e. in the height direction in which the salvage system is erected when the cushions are inflated. Outward bending of the column is also prevented, or at least countered, because of this axial stabilization of the pivoting construction, whereby the lifting cushions can better support in axial direction a load for lifting.

The radial shackles are pivotally connectable to the connecting collars, for instance by a pin-hole attachment. A radial shackle can be a single-layer element, such as a substantially stiff rod with pivot eye on both outer ends, or can be a multiple shackle, embodied for instance as two frame parts arranged at a distance from each other by spacer sleeves with an aligned pivot hole on both sides of the two frame parts. The advantage of a multiple embodiment is the greater resistance to deformation. With a multiple shackle a symmetrical load can also be applied more easily over the shackles.

Between or outside the multiple embodiment of a first radial shackle a second shackle can be arranged which can likewise take a multiple or single form. These radial shackles are attached to the connecting collar by means of a pivoting attachment method so that a lengthening of an assembled modular salvage system can be followed by the radial shackles. Vertical pivot eyes can for instance be arranged for this purpose distributed over the periphery of the connecting collars. These pivot eyes are preferably distributed symmetrically in pairs over the periphery so that a symmetrical load can be obtained on the resulting column.

A common rotation point can be obtained by means of arranging a pin, such as a bolt or smooth cylindrical bush, through the pivot eyes and also through the pivot holes of the first radial shackle and second radial shackle optionally connected thereto. It will be apparent that a lower or upper connecting collar can also be connected to only a first or a second radial shackle.

The axial shackles comprise a first and second bending-resistant segment and a flexible segment extending therebetween. A strong as well as compact structure can hereby be assembled. Because the axial shackles comprise a flexible segment a concertina structure results which is folded together in deflated state and straightens when the lifting cushions are inflated, and provides a strong protection here against outward bending in pulling direction of the axial shackles. The bending-resistant segments have more stiffness in bending direction and the flexible segments but do not need to be totally rigid in the absolute sense.

The stiffness of the bending-resistant segments in combination with the flexible segment received therebetween provides for a compact construction in assembled, not yet inflated state, whereby a low insertion height can be achieved. This is particularly advantageous when there is little clearance between a part of an object for lifting and the ground surface. The bending-resistant segments provide for a reliable retention of the orientation of the components, for instance during assembly, and stability of the final column. The lifting cushions hereby remain better aligned relative to each other during assembly of the salvage system.

By means of the described structure of the modular salvage system a relatively high maximum lifting height can be achieved with a relatively small footprint, i.e. the surface area necessary for placing the salvage system, while the risk of outward bending of the lifting cushions relative to each other is mitigated. In addition, it is possible using this modular salvage system to assemble the system to size on site from relatively small practical elements.

A preferred embodiment of a modular salvage system according to the present invention has the feature that the axial shackle comprises at least two flexible belts placed on each other, wherein at the position of the first and the second bending-resistant segment the flexible belts are connected durably to each other with connecting means to form a bending-resistant assembly and retain their flexibility in the flexible segment. Belts, such as plastic tensioning straps, are typically individually bendable out of the plane of the belt itself, but belts also typically provide a high tensile force when loaded in length direction. Belts, particularly in the case of belts of some width, additionally provide resistance to rotations in the plane of the belt.

By placing at least two belts, but preferably three or four belts, onto each other and connecting these layers of belts to each other with connecting means, such as for instance stitching, rivets, glue, fusing or other methods of connection, an axial shackle results with high degree of strength in axial direction, i.e. the length direction of the belt, while the assembly of belts, such as tensioning strap-like belts, displays sufficient flexibility out of the plane of the belt. Bending resistance in the bending-resistant segments of the axial shackle can for instance be implemented by means of a sleeve round these segments which leaves the flexible segment clear, by implantation of a bending-resistant element, such as a metal plate segment enclosed between the layers of the belts, or by chemical treatment of the belts such that the bending-resistant segments are stiffened individually or as assembled layer package.

A further preferred embodiment of a modular salvage system according to the present invention has the feature that the connecting means comprise stitching which extends substantially only over the first and second bending-resistant segments. The assembly of mutually stacked belts, such as for instance strap-like belts, can be placed onto each other here and subsequently connected to each other with a robust stitching with a relatively strong thread by passing the thread through the different layers of the belt assembly and thus forming a stitch. By arranging this stitching, which is arranged through the layers of the belt assembly, only in the bending-resistant segment an increased bending resistance is provided by means of the stitching itself in that the various layers are attached to each other non-movably relative to each other. By not stitching the layers in the flexible segment of the belt assembly, and preferably even leaving them wholly clear, the layers in this segment retain their flexibility.

A preferred embodiment of a modular salvage system according to the present invention has the feature that successive lifting cushions are coupled to each other with cushion coupling means such that the cushion coupling means contribute in operation toward the axial alignment of successive lifting cushions in a deflated and an inflated state of the lifting cushions. As described above, it is important to be able to assemble the modular salvage system in a short time on site. In addition, it is advantageous that the lifting cushions ultimately stand as straight as possible above each other in a column so that during a lifting operation the forces are transmitted in as straight a manner as possible between the successive cushions. Provided for this purpose according to this embodiment of the salvage system are cushion coupling means which contribute toward the axial alignment of successive cushions in both inflated and empty state, but also during the transition phases in which individual lifting cushions are in the process of being inflated.

The cushion coupling means can wholly fix successive lifting cushions relative to each other such that a rigid unit is formed, or can be configured such that they only partially limit a relative freedom of movement of the cushions, wherein an axial alignment of the cushions is hereby nevertheless enhanced. In this latter case successive lifting cushions can for instance remain mutually releasable or freely rotatable around the axial axis.

The cushion coupling means can be an integral part of the lifting cushions, be connectable to the lifting cushions or for instance be arranged as separate member between two successive lifting cushions, and can comprise screw thread for robust mounting in a lifting cushion. In an embodiment the cushion coupling means comprise a central flange and on either side of this flange a protrusion provided with screw thread. With the one protrusion the cushion coupling means can then be mounted in a first lifting cushion, which is then provided with a screw thread co-acting therewith, and with the other protrusion be mounted in corresponding manner in the subsequent lifting cushion. The two lifting cushions are hereby coupled to each other. A mutual axial alignment is defined relatively accurately by the location of the protrusion and the space in the lifting cushions which receive these protrusions. These mounting means are then preferably arranged centrally on an upper and lower side of the lifting cushions.

A preferred embodiment of a modular salvage system according to the present invention has the feature that the cushion coupling means allow an axial rotation of successive lifting cushions relative to each other. Axial alignment is on the one hand favourable for the direction in which forces are transmitted during a lifting operation, although it is on the other hand important to have some freedom of rotation in the individual lifting cushions. Owing to such a freedom of rotation of the lifting cushions which is maintained following assembly and coupling of successive lifting cushions by the cushion coupling means, it is easier to organize systematically and clearly an infrastructure applied during salvaging, such as for instance the compressed air lines used to inflate the lifting cushions, relative to each other and preferably not allow them to become intertwined in chaotic manner. If a lifting cushion is not connected correctly, it is thus possible for instance to quickly work out which line leads to the lifting cushion which, for instance due to a leaking or loose feed conduit, is insufficiently inflated.

A further preferred embodiment of a modular salvage system according to the present invention has the feature that the cushion coupling means comprise a first and a second mutually engaging coupling element, wherein the first coupling element comprises a protrusion for receiving in a recess of the second coupling element. By providing for instance the upper sides of each lifting cushion with a male cushion coupling means, i.e. provided with a protrusion, and providing the undersides with female cushion coupling means, i.e. provided with a recess for receiving the protrusion, the lifting cushions can be coupled quickly and accurately to each other. The cushions become mutually aligned with each other by screwing or otherwise attaching the cushion coupling means in for instance a central cavity on the surface of the lifting cushion and subsequently laying the lifting cushions onto each other such that the male cushion coupling means drops or engages in the female cushion coupling means. The cushion coupling means, in particular the protrusion and the recess, can be shaped and dimensioned here such that a rotation about the axial axis is established, for instance by placing a hexagonal protrusion into a close-fitting hexagonal recess, or such that this freedom of rotation is retained, for instance by making use of a round protrusion in a round recess.

A further preferred embodiment of a modular salvage system according to the present invention has the feature that the cushion coupling means are connectable to the lifting cushions in a substantially central opening in the lifting cushions, wherein the cushion coupling means contribute externally toward sealing of the openings. The lifting cushions can be manufactured in a manner as described in Netherlands patent NL 2013075. These lifting cushions have no seams but are formed by wrapping fibres around a mould. Openings are formed here on upper and lower side in the lifting cushion. These central openings can advantageously be utilized as locations for receiving the cushion coupling means. The cushion coupling means can contribute here toward the sealing of these cushions, for instance by applying a sealing ring.

The lifting cushions can be inflated by means of (compressed) air, other gases or mixtures of gases or even liquids. Each cushion can be individually provided for this purpose with a valve or other connection for individual inflation of each cushion. A particular embodiment of the salvage system according to the invention has the feature however that the cushion coupling means maintain an open communication internally between the openings in the lifting cushions. The body cavities of the successive cushions are hereby in open communication with each other, and will inflate simultaneously when one of the cushions is connected.

A further preferred embodiment of a modular salvage system according to the present invention has the feature that the cushion coupling means are at least partially formed as integral part of the lifting cushions. The lifting cushions can be produced and shaped in a variety of ways. The cushion coupling means can hereby be an integral part of the upper and lower sides of the lifting cushion. This can be advantageous for the assembly time of the modular salvage system.

A preferred embodiment of a modular salvage system according to the present invention has the feature that the connecting collar comprises at least a first and a second collar segment which are connectable to each other. Dividing the connecting collar into a number of smaller connectable collar segments is advantageous, among other ways with a view to storage of the salvage system. A locked connecting collar can moreover be heavy and relatively difficult to handle, and certainly when this connecting collar is formed from metal, such as stainless steel. In addition, the manufacture of a connecting collar in one part is in some cases more complex than the manufacture of smaller mutually connectable collar segments. The collar segments can be connected to each other in known ways during assembly of the salvage system, for instance by providing pin-hole connections therein. A preferred embodiment of a modular salvage system according to the present invention has the feature that at least one telescopic strut is connectable to a distal outer end of a set of radial shackles of a lifting cushion such that during operation the erection of the whole by inflating at least one lifting cushion is followed by a telescopic extension of the strut, while an opposite movement is counteracted by the strut. Suitable here is any telescopic structure which facilitates extension but which during compression in length direction provides support to the structure coupled to the strut. This can be a support using a strut blocking automatically during compression as described in NL 2004931, or a strut which can be blocked manually as desired. The strut can for instance be mounted on one of the connecting collars or on one of the radial shackles. It is found particularly advantageous to mount such a strut on the coupling segment of one of the upper first radial shackles. In a preferred embodiment a number of struts, in particular three, are arranged around the salvage system. This can be embodied symmetrically all around or in asymmetric manner for the purpose of supporting the system, so that an object, once raised by the inflated lifting cushions, is also supported by the struts.

A preferred embodiment of a modular salvage system according to the present invention has the feature that the uppermost connecting collar is provided with an interface module for transmitting a lifting force to an object for lifting. A further preferred embodiment of a modular salvage system according to the present invention has the feature that the object for lifting is an aircraft and that the interface module comprises a ball protrusion intended and configured to be received in a receiving part of an aircraft wing.

Aircraft are typically equipped with one or more jacking points which are suitable for a hard coupling to an aircraft lifting system such as the modular salvage system according to the invention. The modular salvage system comprises for this purpose an interface module with a protrusion which is ball-shaped, or at least comprises a ball segment, and which is formed and intended to be received in such a jacking point of an aircraft. Such receiving members are typically arranged for instance on the root of an aircraft wing where the wing transposes into the fuselage of the aircraft. Because of this hard coupling between the lifting system and the aircraft the lifting force can be transmitted effectively to the aircraft. In addition, such jacking points are typically connected to frame parts of the aircraft, whereby the danger of the aircraft being deformed as a result of being raised is reduced, even in the case of high lifting forces.

A further embodiment of a modular salvage system according to the present invention has the feature that the object for lifting is an aircraft and that the interface module comprises an individually inflatable contact cushion having a relatively large contact surface area compared to the inflatable cushions. The individually inflatable contact cushion particularly comprises a low-pressure cushion here which can adjust itself to the form of the aircraft contact surface of the aircraft for salvaging. An aircraft is not strong enough at all locations to absorb an external pressure. A deformation on the outer side of an aircraft can however have very adverse consequences for the aerodynamics and flight-worthiness of the aircraft. In the case the aircraft has to be lifted not (only) at the position of a jacking point, an interface module provided with such a low-pressure cushion can advantageously be utilized. This low-pressure cushion is coupled to the upper side of the salvage system and inflated such that the low-pressure cushion remains deformable upon contact with the aircraft. Because the salvage system transmits its lifting force via a relatively large surface area, the pressure on the outer side of the aircraft is limited here.

The invention also relates to a lifting module for assembling a salvage system according to the invention, comprising an inflatable lifting cushion, at least one connecting collar, a number of first and second radial shackles and a number of axial shackles. The salvage system is constructed from one or more of such lifting modules which each comprise all necessary components, including a connecting collar, lifting cushion and the various connecting shackles (both radial and axial) of the repetitive pattern therein. The maximum lifting height of the whole assembled salvage system can be determined by constructing the salvage system from such lifting modules. It is advantageous for an airport to have such a salvage system available in modular form so that in the case of an incident the correct modules can be utilized to form a salvage system with the appropriate specifications in line with the properties of the object for salvaging in the light of the overall situation.

A preferred embodiment of a lifting module according to the invention has the feature that the axial shackles are provided in at least two different lengths. A maximum lifting height of the salvage system and the contact surface between two successive lifting cushions can be influenced here by means of selecting the lengths of the axial shackles. Successive lifting modules are connected to each other in axial direction by means of axial shackles. These axial shackles limit the maximum distance over which two successive modules can move relative to each other during inflation of the lifting cushions. The axial shackles hereby also determine the maximum height of a lifting cushion in inflated state, whereby a lifting cushion undergoes a certain measure of flattening. A greater lifting height can be reached by applying long axial shackles. While shorter axial shackles provide a smaller lifting height per lifting module, the lifting cushions are conversely then more heavily loadable. This is because the shorter shackles result in more flattening of the lifting cushion, and thereby a greater contact surface area between successive lifting cushions. The lifting force is hereby distributed over a greater surface area, whereby the lifting pressure on the cushions decreases and the lifting capacity of the system increases.

In some cases a specification can hereby be obtained which is appropriate for the situation from a plurality of lifting modules, with selection of the length of the axial shackles, and maximum lifting height and lifting capacity can be traded off against each other. The choice of axial shackle length is preferably the same per lifting module. Varying axial shackle lengths can however be selected per lifting module over the height of the assembled salvage system.

A further preferred embodiment of the salvage system according to the invention has the feature that form-retaining bridge parts are provided therein which are placeable between successive connecting collars and, when placed, bring about a force transmission between the connecting collars. The bridge parts thus form a rigid vertical column which mechanically secures the cushion column in the undesirable case a cushion should lose its lifting force, for instance because it starts to leak. The salvage system is preferably characterized here in that on a side facing toward a lifting cushion the bridge parts are shaped in accordance with a contour of the lifting cushion in its inflated state so as to fit as closely as possible thereto.

The invention also relates to a container comprising components of at least one lifting module of the modular salvage system according to the present invention. The salvage system can typically be held at an airport in one or more of such containers which, in the case deployment is required, are taken to a position close to the location of the incident. Situated in the container(s) are the diverse components of the salvage system and optionally also assembling material and tools.

For the purpose of constructing on site the correct assembly for various types of aircraft and situations a container preferably comprises here an adequate number of axial shackles of at least a first length dimension as well as a differing second length dimension. A salvage system can hereby be assembled in which a choice of lifting capacity can be made against lifting height per lifting module. The container preferably also comprises means for inflating the lifting cushions, such as a compressed air installation, conduits, and can also comprise an internal power supply in the form of a generator. A substantially self-sufficient salvage system is hereby provided which can be deployed quickly in the case of an incident. Such a container is also easy to place on a truck or in a cargo plane or helicopter for transport to a remote airfield or remote part of the airport.

The invention also relates to an aircraft lifting system comprising a cushion stack of successive inflatable lifting cushions mutually connected by cushion coupling means and assembled with the salvage system according to the invention.

A method for assembling a modular salvage system according to the present invention comprises the steps of placing the first connecting collar on a ground surface, coupling cushion coupling means in the first and second lifting cushions in order to seal the first and second lifting cushions, placing the first deflated lifting cushion, placing the second connecting collar on the deflated lifting cushion, placing the second deflated lifting cushion on the first lifting cushion while coupling the cushion coupling means of the first and second lifting cushions and enclosing the second connecting collar, placing the third connecting collar above the second lifting cushion, pivotally mounting a plurality of first radial shackles on the first and second connecting collar, pivotally coupling a plurality of second radial shackles between the coupling segment of the first radial shackles and the upper connecting collar, coupling coupling segments lying one above another by means of a plurality of axial shackles. These steps need not necessarily be performed in the stated sequence. A salvage operation is in many cases a team effort and different people can work simultaneously on different subassemblies. Nor need the final assembly necessarily take place in the stated sequence, although determined steps are possibly related to each other or dependent on each other, so that it can be advantageous to follow a specific sequence.

In a preferred embodiment the method comprises a step, prior to coupling of the coupling segments lying one above another, of selecting a length dimension for the plurality of axial shackles from a selection of at least two mutually differing axial shackle length dimensions. By selecting the length dimension of the axial shackles a specific lifting capacity and lifting height of the assembled salvage system can be provided which is suitable for the specific situation of deployment.

The invention will now be further elucidated on the basis of a number of exemplary embodiments and an associated drawing. In the drawing.

The figures are otherwise of purely schematic nature and not drawn to scale. Some dimensions in particular may be exaggerated to greater or lesser extent for the sake of clarity. Corresponding parts are designated as far as possible in the figures with the same reference numeral.

Figure 1:
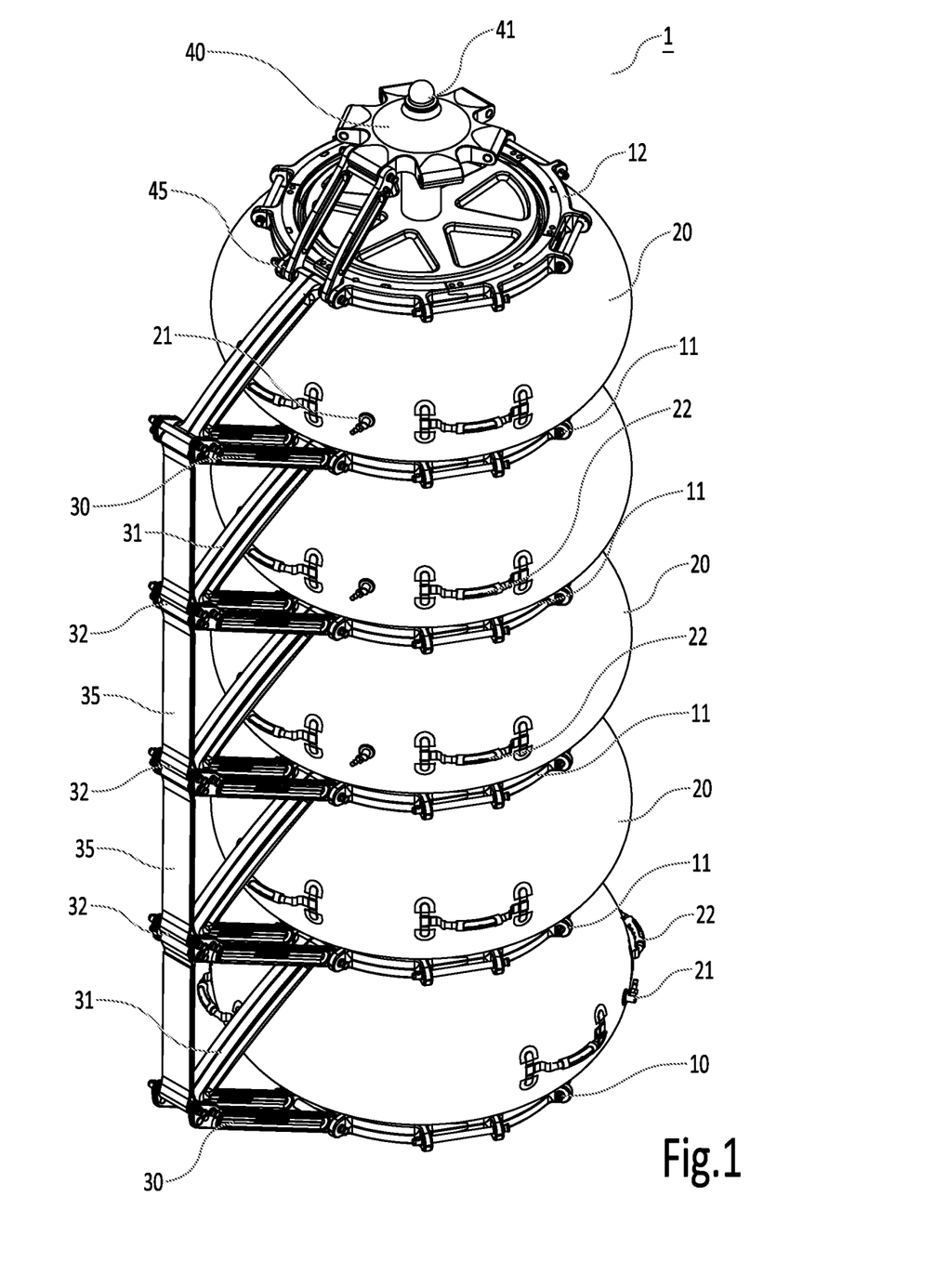
FIG. 1 is a schematic perspective impression of an exemplary embodiment of a modular salvage system in inflated state according to the invention provided with a jacking point interface module.

As shown in FIG. 1 in an exemplary embodiment, modular salvage system 1, shown here in fully inflated state, comprises a first connecting collar 10 resting on the ground surface. Depending on the situation, this ground surface can be reinforced with for instance a bottom mat (not shown) so that the connecting collar does not sink into the ground when loaded and remains clean. Arranged on lower connecting collar 10 are a number of lifting cushions 20 which can be manoeuvred by means of handgrips 22. Lifting cushions 20 are shown here in inflated state. A lifting cushion 20 can be inflated via an air valve 21 provided therein to which a compressed air line (not shown) can be connected.

In the shown embodiment the salvage system comprises five lifting cushions 20, wherein the lifting cushions are enclosed by connecting collars 11 between lifting cushions 20. Upper connecting collar 12 is coupled to a jacking point interface module 40 for receiving in a jacking point of an aircraft. The lifting force is transmitted to the aircraft via this interface module, and in particular via ball segment 41 of this interface module 40. During lifting of a stranded aircraft it is possible that the angle at which the aircraft comes to lie will vary during lifting. Ball segment 41 is received in a recess of the reinforced jacking point of an aircraft and, because of the ball-like interface, can continue to transmit the lifting force at the varying angle to the frame of the aircraft.

Lower connecting collar 10 is connected to a first radial shackle 30. This shackle comprises two metal plate parts which are arranged at a distance from each other and in which mutually aligned pivot holes 45 are provided on a first proximal side which are pivotally coupled to connecting collar 10 by means of a pivot pin 46 arranged in pivot eyes 47 in connecting collars 10, 11, 12. Connecting collars 11 arranged between lifting cushions 20 are coupled pivotally to a first radial shackle 30 and a second radial shackle 31, both of which are coupled to connecting collars 11 using pivot pin 46. Upper connecting collar 12 is coupled pivotally to an interface shackle to interface module 40 and a second radial shackle 31. Connecting collars 10, 11, 12 comprise six pairs of pivot eyes 47 arranged substantially symmetrically on the periphery of the connecting collars. Radial shackles 30 are shown on only one side in this figure, although all shackles will in practice be arranged all around before inflation of lifting cushions 20.

Each set of a first radial shackle 30 and a second radial shackle 31 between successive connecting collars is coupled pivotally relative to each other at a distal outer end by means of pivot pins at the position of a coupling segment 32. Provided in this coupling segment 32, which forms an integral part of first radial shackle 30, are pivot openings for pivoting attachment of second radial shackle 30. The coupling segment also serves the purpose of coupling an axial shackle 35 between the sets of radial shackles. This axial shackle 35 is provided with a first and second bending-resistant segment between which a flexible segment extends. The axial shackles are provided at both outer ends with pivot loops 48 through which a pivot pin can be inserted for the purpose of coupling to coupling segment 32.

Figure 2A:
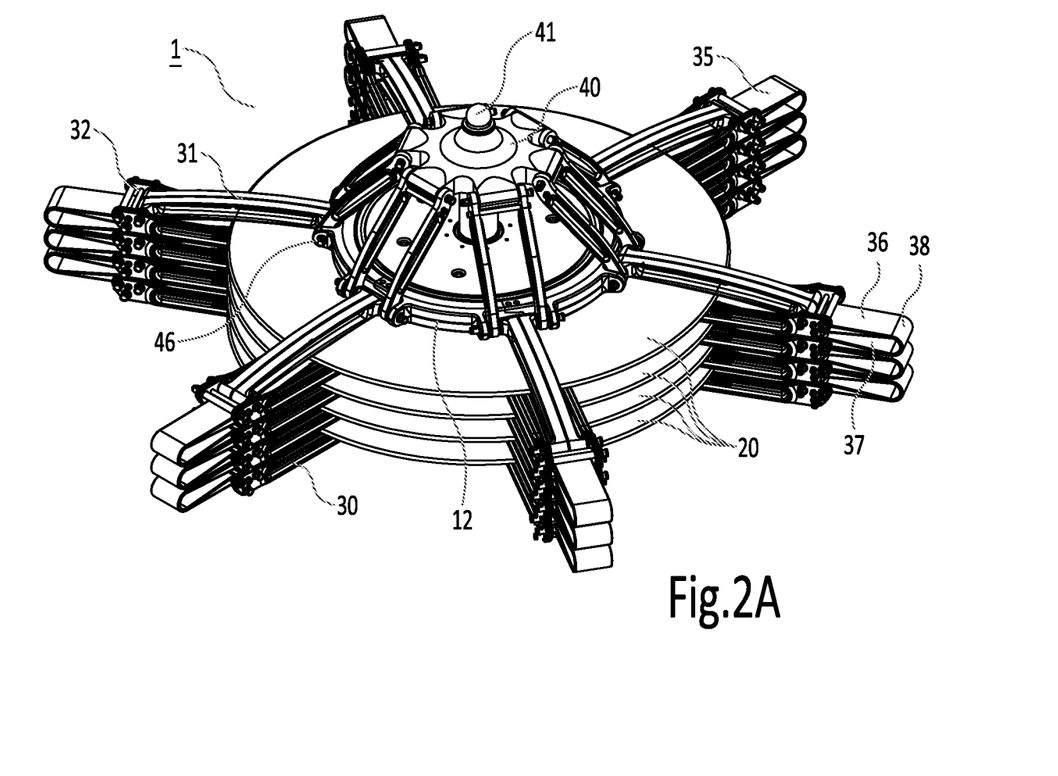
FIG. 2A is a schematic perspective impression of the modular salvage system shown in FIG. 1 in deflated state.
Figure 2B:
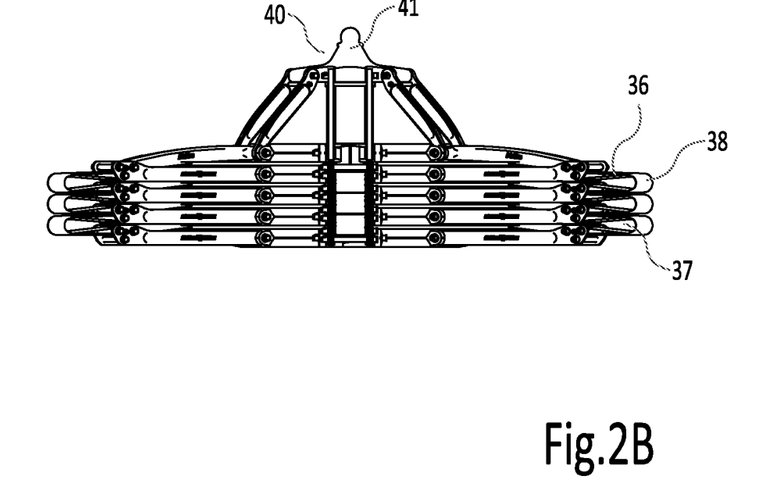
FIG. 2B is a side view of the modular salvage system shown in FIG. 2A in deflated state.
Figure 2C:
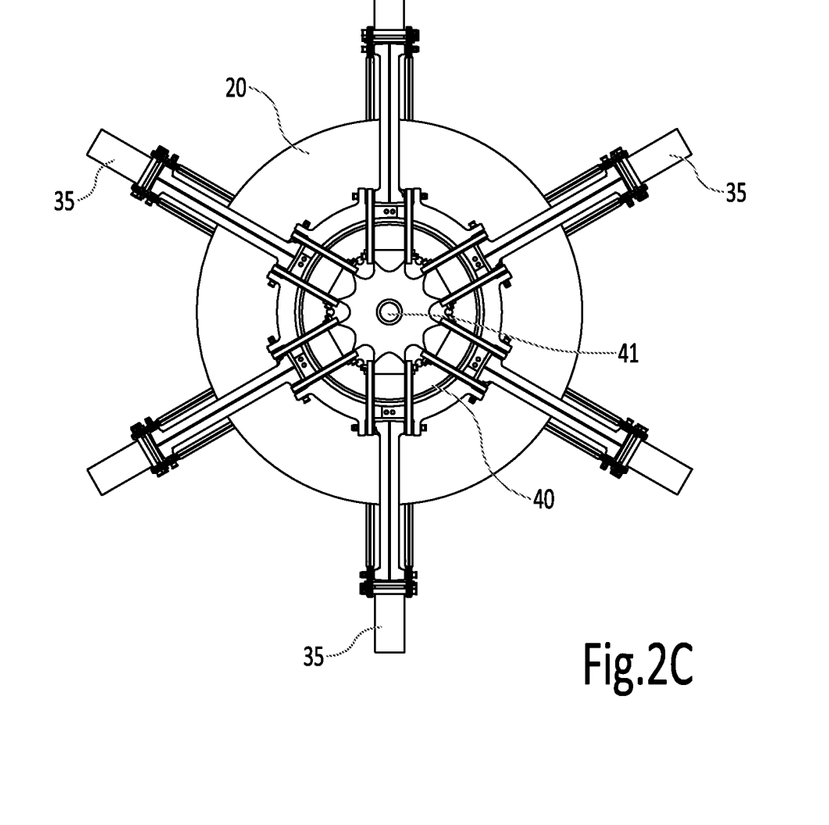
FIG. 2C is a top view of the modular salvage system shown in FIG. 2A in deflated state.

FIGS. 2A-2C show the salvage system shown in FIG. 1, wherein lifting cushions 20 are not inflated. In this state the entity of first and second radial shackles 30, 31 is pressed together and in side view forms a zigzag pattern. During inflation of lifting cushions 20 these radial shackles 30, 31 pivot in the manner of a concertina and the shackles thus follow the extension of the overall salvage system which results during inflation of lifting cushions 20. Jacking point interface module 40 is implemented here such that it is placeable in the upper cushion coupling means of upper lifting cushion 20 and is coupled by means of interface shackles to the upper connecting collar.

Shown clearly in FIG. 2A is how in this deflated state axial shackles 35 are bent at the location of flexible segment 38. Axial shackles 35 are formed by three tensioning strap-like belts which are attached to each other and wherein the first and second bending-resistant segment 36, 37 are formed by means of being stitched tightly to each other with a very strong thread only at the position of bending-resistant segments 36, 37 while leaving clear the flexible segment 38 of axial shackles 35. One of the layers of this assembly of tensioning strap-like belts is folded back with an additional length of belt in order to thus form an integrally formed pivot loop 48 at both outer ends of axial shackle 35.

Figure 3A:
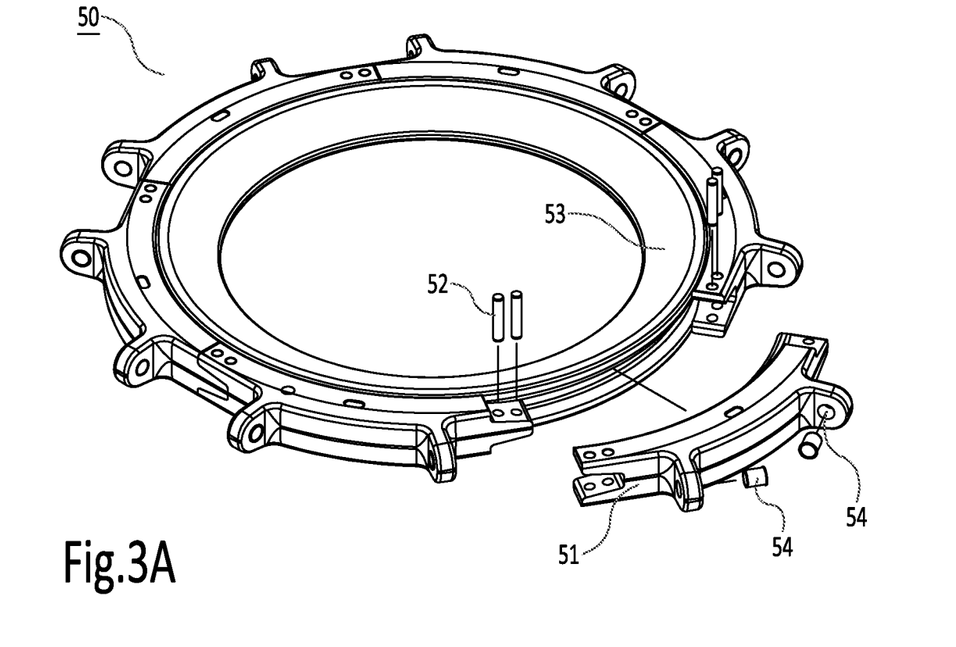
FIG. 3A is an exploded view of the assembly of a segmented connecting collar as applicable in the modular salvage system according to the invention.
Figure 3B:
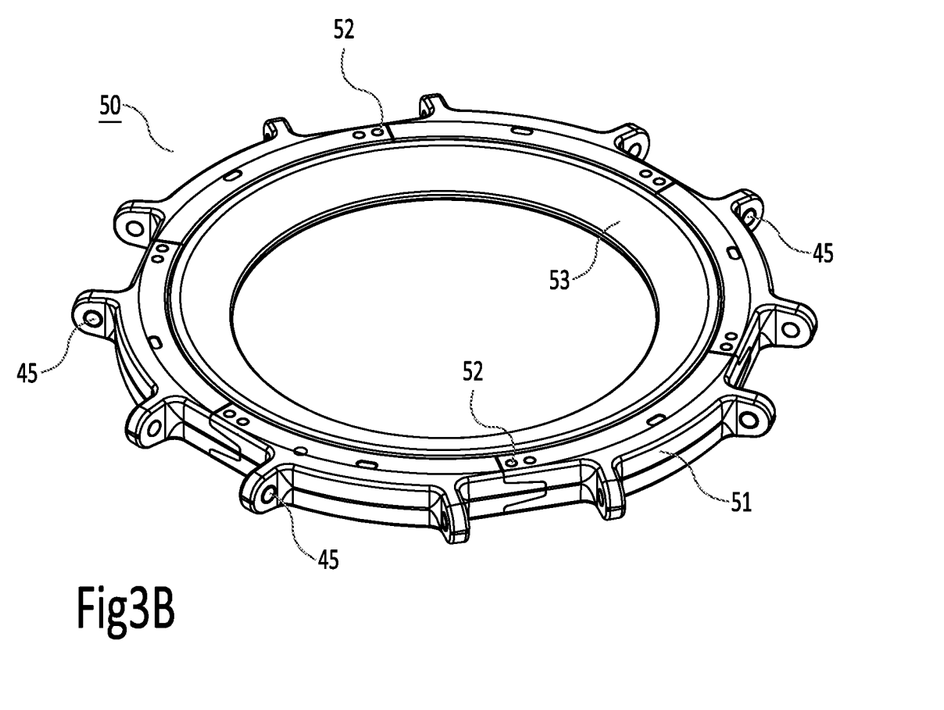
FIG. 3B is a perspective impression of an assembled segmented connecting collar as applicable in the modular salvage system according to the invention.

FIGS. 3A-3B show a segmented embodiment of connecting collar 50. Shown in FIG. 3A is that the various segments 51, in this embodiment six, slide into each other on two sides and are secured with pin connections 52 around a lifting cushion support 53. This lifting cushion support 53 is formed here from the same plastic material as the lifting cushions, although in an alternative embodiment (not shown) this lifting cushion support can also be formed from a material, such as a metal or rubber, differing from that of the lifting cushion. The lifting cushion support also serves as shaping mould for the purpose of facilitating and guiding joining of the various collar segments 51. Pivot eyes 45 are reinforced with a pivot eye bush 54 for receiving a pivot pin with which the radial shackles can be connected to connecting collar 50. The thus formed segmented connecting collar can then be deployed in the same manner as connecting collars 10, 11, 12 shown in FIGS. 1 and 2.

Figures 4, 5A:
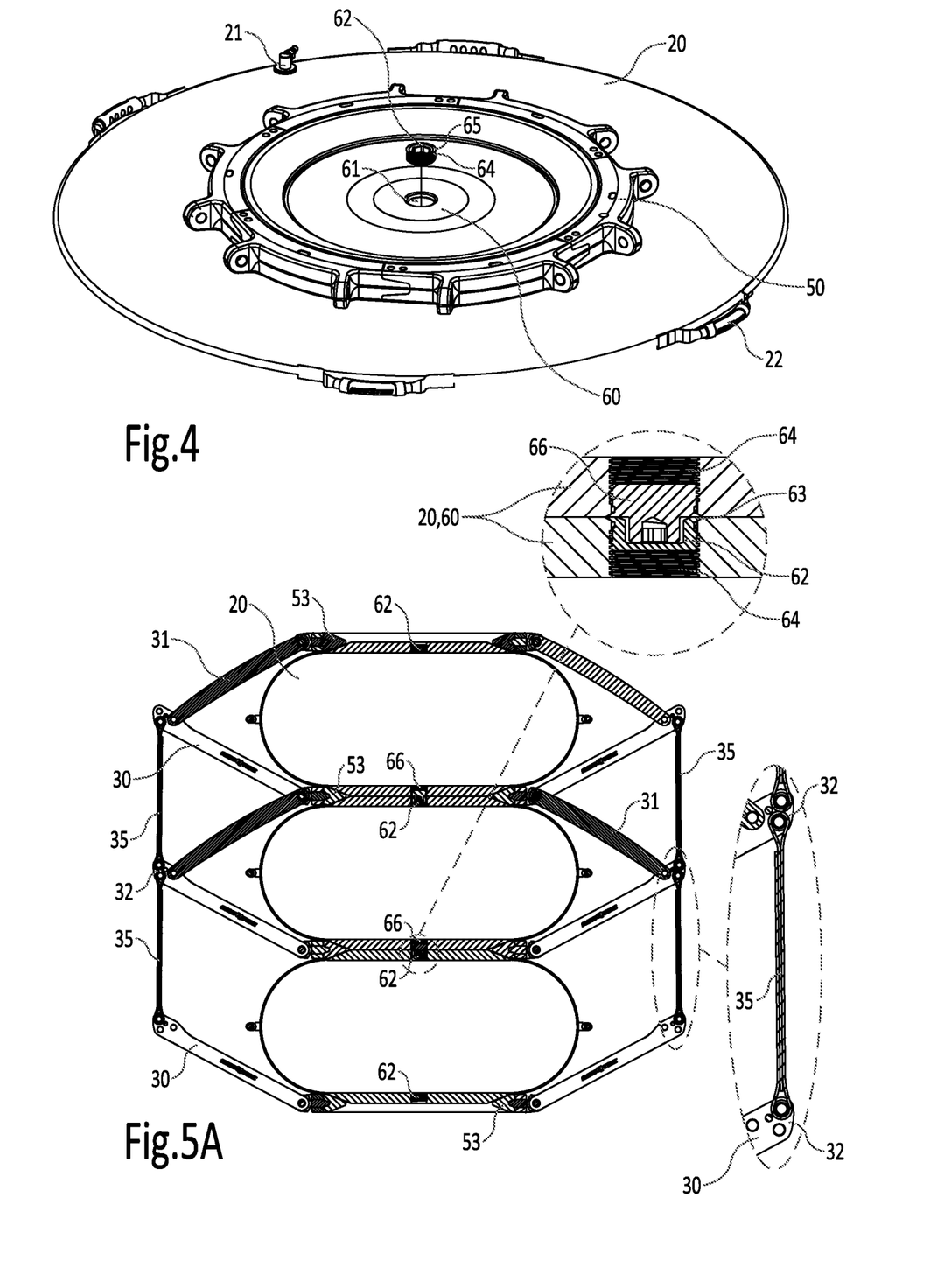
FIG. 4 is a perspective impression of a lifting cushion provided with cushion coupling means.
FIG. 5A is a cross-section of the salvage system shown in FIG. 5B along the line A-A with a detail view of the coupling of the cushion coupling means and a detail view of the construction of the axial shackle.

Shown in FIG. 4 is a lifting cushion 20 provided with valve 21 and four handgrips 22. Lifting cushion 20 is formed such that a substantially ellipsoidal body is formed during inflation. The upper and lower sides are provided with a level part 60 in which inter alia a hole 61 provided with screw thread is arranged. A cushion coupling means 62 can be screwed into this hole. Cushion coupling means 62 is provided on a peripheral side with screw thread 64 and comprises a sealing collar 65 with which hole 61 in lifting cushion 20 is sealed airtightly. Cushion coupling means 62 is provided on the side facing toward the following lifting cushion with a recess 63, and so a female cushion coupling means 62 which can be coupled to a male cushion coupling means 66 on an underside of a following lifting cushion 20.

Figure 5B:
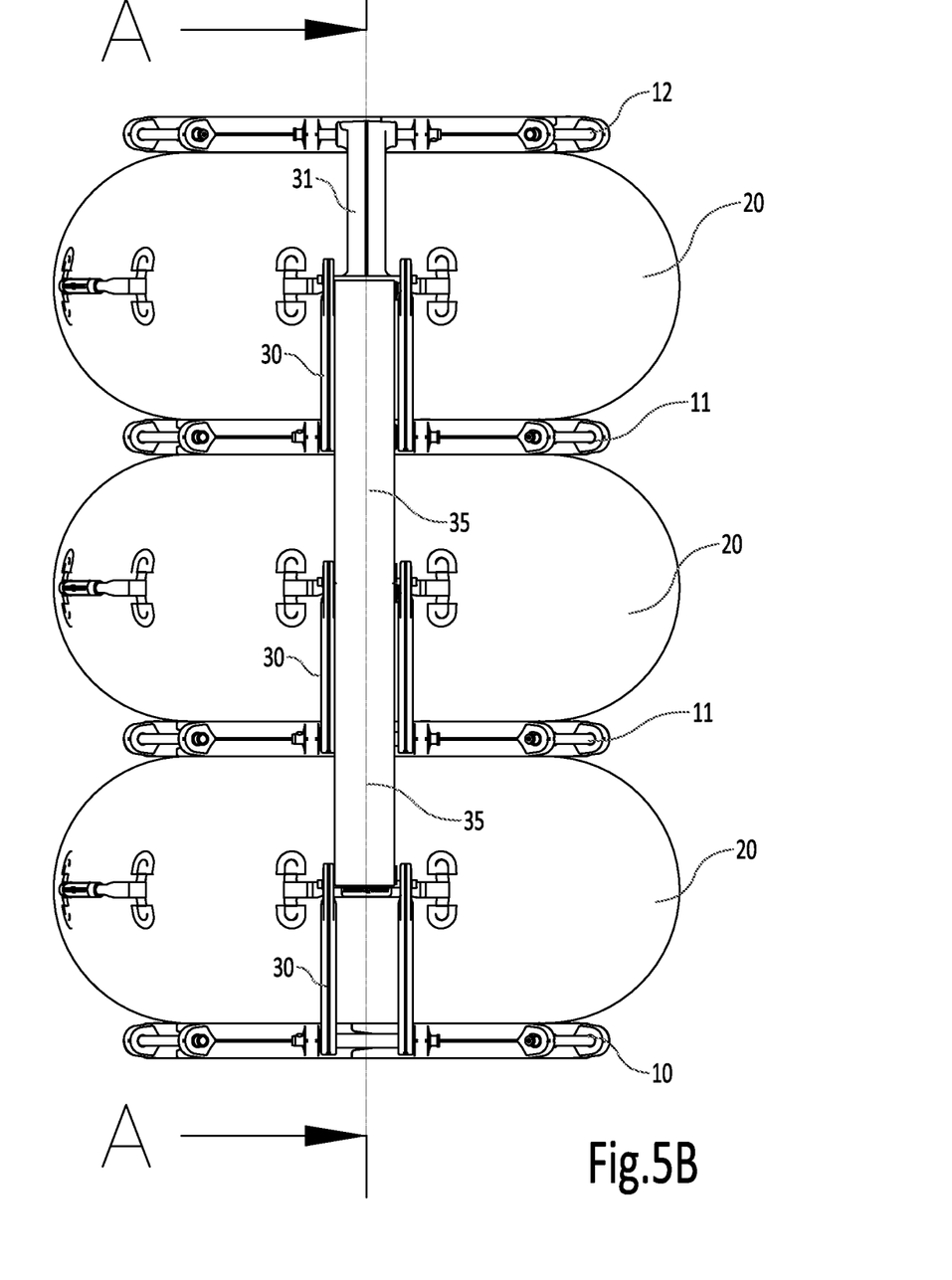
FIG. 5B is a side view of an exemplary embodiment of a modular salvage system according to the invention in inflated state.
Figure 6A:
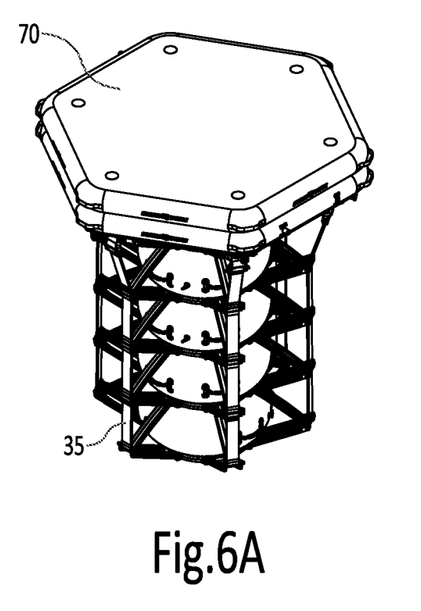
FIG. 6A is a schematic perspective impression of an exemplary embodiment of a modular salvage system according to the invention in inflated state and provided with a low-pressure cushion interface module.
Figure 6B:
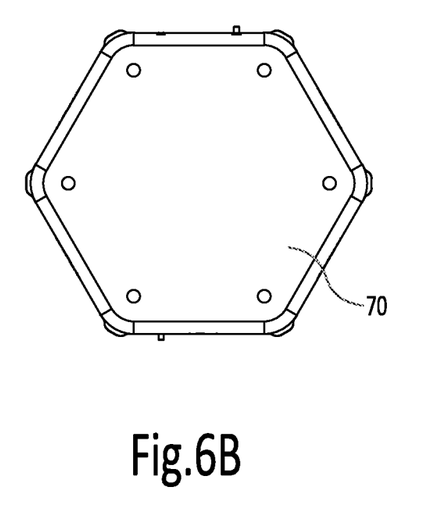
FIG. 6B is a top view of the modular salvage system shown in FIG. 6A in inflated state.
Figure 6C:
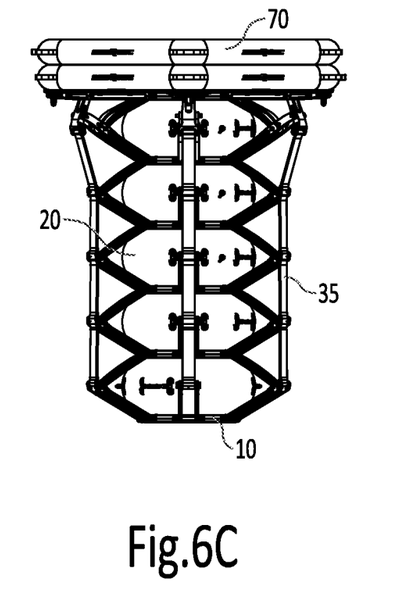
FIG. 6C is a front view of the modular salvage system shown in FIG. 6A in inflated state.
Figure 6D:
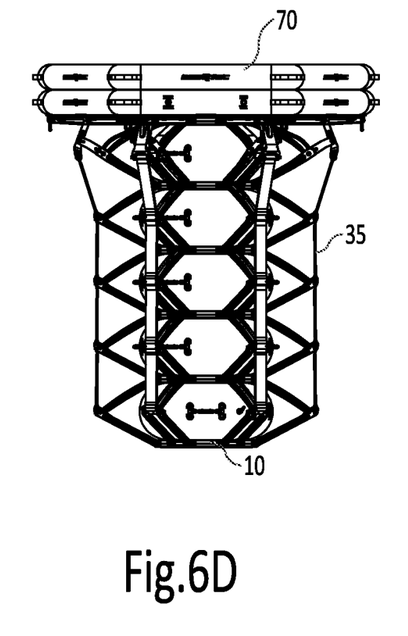
FIG. 6D is a side view of the modular salvage system shown in FIG. 6A in inflated state.

FIG. 5B shows a side view of an exemplary embodiment of salvage system 1 in inflated state. Line A-A shows herein the lines along which the cross-section as shown in FIG. 5A is made. The three shown lifting cushions 20 are enclosed between connecting collars 10, 11, 12 in which a lifting cushion support 53 is arranged for the purpose of guiding and supporting lifting cushions 20. The lifting cushions are sealed airtightly at top and bottom using cushion coupling means 62, 66. As shown in the detail of FIG. 5A, female cushion coupling means 62 is provided with a recess 63 which is shaped to receive protrusion 66 of male cushion coupling means 66.

Also shown in cross-section in FIG. 5A is an enlarged detail of an embodiment of an axial shackle 35. A single tensioning strap-like belt is folded over three times herein, i.e. a first straight part, a bend forming a first pivot loop 48, straight back along the first straight part, a bend forming a second pivot loop 48 round the first and second straight parts, and subsequently locked to each other with a stitching in the first and second bending-resistant segments while leaving the flexible segment clear.

Shown in FIGS. 6A-6D is an exemplary embodiment of a salvage system in inflated state provided with a low-pressure cushion interface module which comprises a low-pressure contact cushion 70 with a relatively large aircraft contact surface and which is formed and inflated such that the shape of the contact surface can adjust to the surface of the aircraft to be contacted while transmitting the lifting force.

Not all locations on the outer side of typical aircraft are suitable for pressing against with forces necessary to lift an aircraft. Deformations on the outer side of an aircraft have very adverse consequences for the aerodynamics and flight-worthiness in general. In the case the aircraft cannot (only) be lifted at the location of a jacking point, the modular salvage system must however still press against another surface of the aircraft.

For this purpose the interface module of this embodiment is provided with the low-pressure contact cushion 70. This low-pressure cushion 70 is coupled to the upper side of salvage system 1 and inflated such that low-pressure cushion 70 is deformable when making contact with the aircraft. Because the salvage system transmits its lifting force via a relatively large area of this cushion when compared to the contact surface area of lifting cushions 20, the pressure on the outer side of the aircraft is limited, while the aircraft can nevertheless be raised. The pressure in the low-pressure cushion and the number of individually inflatable layers from which the low-pressure cushion is constructed can be adapted to the type of aircraft which has to be lifted, and even to the extent of required deformation. In the shown exemplary embodiment a two-layer low-pressure cushion 70 is coupled to the interface module.

Figure 7:
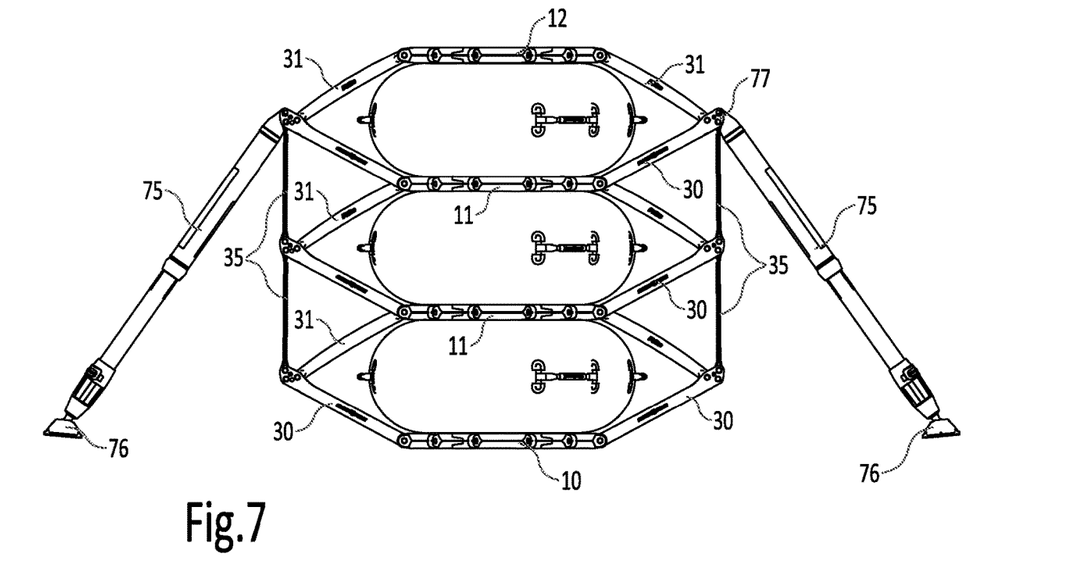
FIG. 7 is a schematic side view of an exemplary embodiment of a modular salvage system according to the invention in inflated state and provided with struts.

FIG. 7 shows a modular salvage system on which two struts 75 are mounted. Struts 75 are retractable and extendable telescopic elements configured such that an extension of strut 75 is facilitated substantially freely, while when strut 75 is compressed a blocking mechanism in the strut counteracts and substantially even wholly prevents retraction. Strut 75 comprises a foot 76 with which the strut supports on the ground and is coupled pivotally to upper coupling segment 32 of the upper first radial shackle 30. The strut is mounted for this purpose at mounting point 77 which is in use at lower coupling segments for the purpose of attaching the axial shackle and which is unused at the upper coupling segment. In an alternative embodiment (not shown) this strut is coupled to the interface module or a connecting collar.

Figure 8:
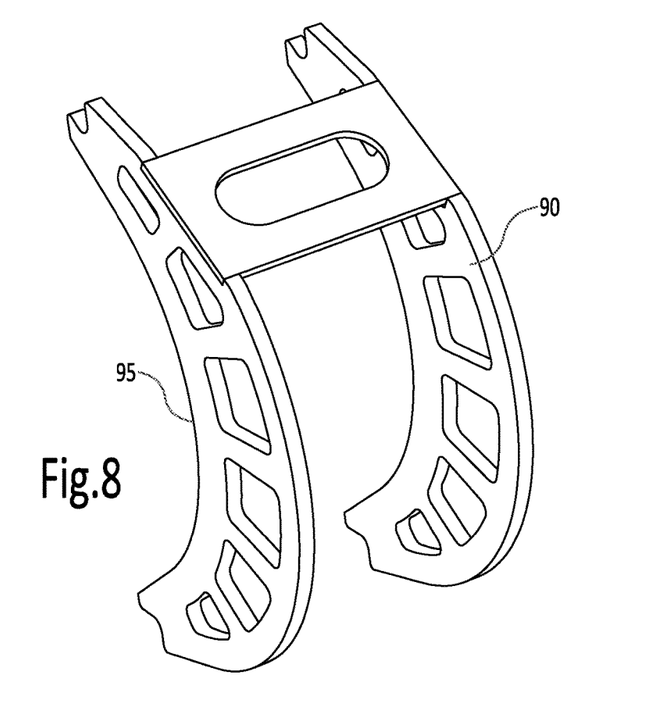
FIG. 8 is a perspective view of a bridge part for application in a salvage system according to the invention.

An additional safety system can be applied to a lifting column erected as has been described above on the basis of the modular salvage system according to the invention. This safety system comprises a number of bridge parts 90 as shown in FIG. 8. On a side facing toward the cushions these bridge parts are provided with a contour 95 which substantially follows the cushions in inflated state. Other than cushion 20 and shackles 35, the bridge parts are form-retaining and formed for this purpose from for instance aluminium or stainless steel. These bridge parts 90 are placed manually round a lifting cushion which has just been inflated. The bridge part is curved on contour 95 so as to remain as closely as possible along the inflated cushion and is manoeuvred over the aluminium pivot arms and secured on the pins in collars 11. Three bridge parts 90 are thus mounted round each lifting cushion 20 and distributed uniformly over the periphery.

This safety system is important for instance when an aircraft is being lifted, particularly with a jack point adapter and when work has to be done under the aircraft after it has been lifted. A requirement not infrequently then applies that the 'load' (the aircraft) must be mechanically secured. Bridge parts 90 ensure this by together forming rigid vertical columns (bridges). These provide for a mechanical blocking in the case a cushion should begin to leak or deflate for other reason at a moment this is not desired.

Figure 9:
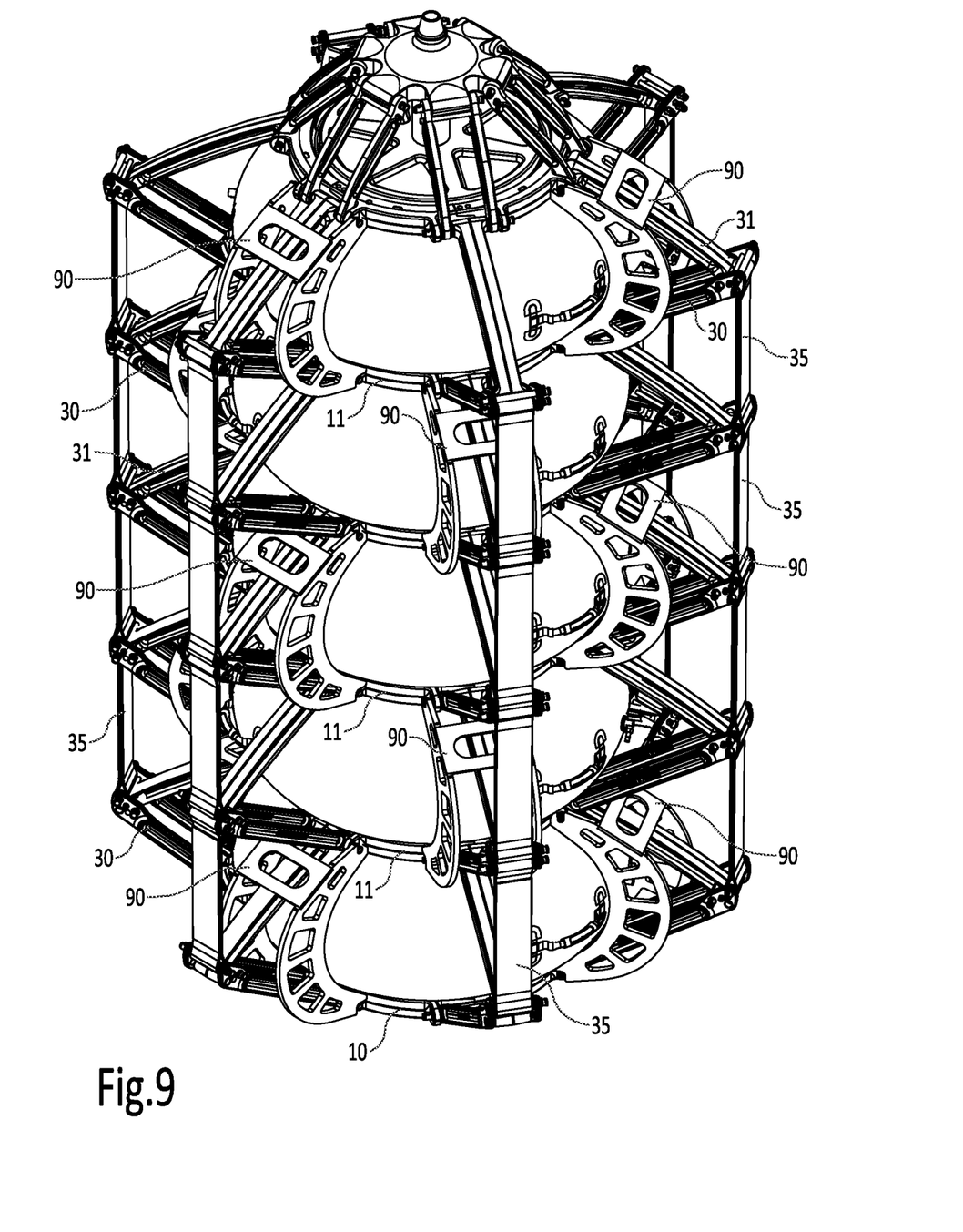
FIG. 9 shows the salvage system according to the invention supported by a number of bridge parts of the type as shown in FIG. 8.

Three bridge parts are used per cushion 20, and at a subsequent cushion 20 the three are traded off in each case since otherwise the number of available pivot pins (six) would be insufficient per layer. Bridge parts 90 can be placed after complete erection of the column, but are advantageously already placed each time as soon as an individual lifting cushion 20 has been inflated. In this latter manner the load is directly secured as soon as the cushion column has been erected and the bridge still having to be assembled later is avoided. Because this latter often also has to take place at height, work would otherwise have to take place for a longer time under a non-secured load in order to construct the mechanical safeguard.

The bridge parts are designed so that they can be manoeuvred round the existing components in the column in extended state in order to place them in position. The bridges are advantageously manufactured from stainless steel or preserved steel because of the high loads which have to be absorbed thereby.

Although the invention has been further elucidated above on the basis of several exemplary embodiments, it will be apparent that the invention is by no means limited thereto. On the contrary, many variations and embodiments are still possible within the scope of the invention for a person with ordinary skill in the art.

The invention claimed is:

1. Modular salvage system for erecting a stack of expandable lifting cushions alternating with form-retaining connecting collars located therebetween, wherein each of the lifting cushions is enclosed between opposite connecting collars, wherein a set of radial shackles is pivotally connectable with proximal outer ends in axial direction to respectively a first and a second of the opposite connecting collars, wherein the shackles of the set of radial shackles are pivotally connectable to each other at a distal outer end and wherein distal outer ends of successive sets of shackles in axial direction are mutually connectable by an axial shackle, wherein the radial shackles are substantially form-retaining and the axial shackles are respectively extendable and foldable at least in axial direction between a compressed and expanded state.

2. Salvage system as claimed in claim 1, comprising a first and at least a second inflatable lifting cushion with a connecting collar on an upper side and underside as well as between the lifting cushions for the purpose of accommodating a lifting cushion in enclosing manner between a set of opposite connecting collars, wherein a connecting collar is provided on a peripheral side with attachment points which are pivotally connectable to the first and the second radial shackle, wherein the first radial shackle is pivotally connectable on a lower of the set of connecting collars and on the other connecting collars comprises a coupling segment which is pivotally connectable to the second radial shackle, which second radial shackle is pivotally connectable to an uppermost of the set of connecting collars, wherein each coupling segment is connectable in axial direction to a subsequent uppermost coupling segment by means of an axial shackle, and wherein the axial shackle comprises a first and second bending-resistant segment between which a flexible segment extends.

3. Salvage system as claimed in claim 2, wherein a tensile strength of the first and second bending-resistant segments and that of the flexible segment are substantially equal to each other.

4. Salvage system as claimed in claim 3, wherein the axial shackle comprises at least two flexible belts placed on each other, wherein at the position of the first and the second bending-resistant segment the flexible belts are connected durably to each other with connecting means to form a bending-resistant assembly and retain their flexibility in the flexible segment.

5. Salvage system as claimed in claim 4, wherein the connecting means comprise stitching which extends substantially only over the first and second bending-resistant segments.

6. Salvage system as claimed in claim 1 wherein successive lifting cushions are coupled to each other with cushion coupling means such that the cushion coupling means contribute in operation toward the axial alignment of successive lifting cushions in a deflated and an inflated state of the lifting cushions.

7. Salvage system as claimed in claim 6, wherein the cushion coupling means allow an axial rotation of successive lifting cushions relative to each other.

8. Salvage system as claimed in claim 6, wherein the cushion coupling means comprise a first and a second mutually engaging coupling element, wherein the first coupling element comprises a protrusion for receiving in a recess of the second coupling element.

9. Salvage system as claimed in claim 5, wherein the cushion coupling means are connectable to the lifting cushions in a substantially central opening in the lifting cushions, wherein the cushion coupling means contribute externally toward sealing of the openings.

10. Salvage system as claimed in claim 9, wherein the cushion coupling means maintain an open communication internally between the openings in the lifting cushions.

11. Salvage system as claimed in one or more of the claims claim 6, characterized in that, wherein the cushion coupling means are at least partially formed as integral part of the lifting cushions.

12. Salvage system as claimed in claim 1, wherein the connecting collar comprises at least a first and a second collar segment which are connectable to each other.

13. Salvage system as claimed in claim 1, wherein at least one telescopic strut is connectable to a distal outer end of a set of radial shackles of a lifting cushion such that during operation the erection of the whole by inflating at least one lifting cushion is followed by a telescopic extension of the strut, while an opposite movement is counteracted by the strut.

14. Salvage system as claimed in claim 1, wherein the uppermost connecting collar is provided with an interface module for transmitting a lifting force to an object for lifting.

15. Salvage system as claimed in claim 14, wherein the interface module comprises a ball protrusion which is intended and configured to be received in a receiving part of an aircraft wing.

16. Salvage system as claimed in claim 14, wherein the interface module comprises an individually inflatable contact cushion having a relatively large contact surface area compared to the inflatable cushions.

17. Salvage system as claimed in claim 1, wherein form-retaining bridge parts are provided therein which are placeable between successive connecting collars and, when placed, bring about a force transmission between the connecting collars.

18. Salvage system as claimed in claim 17, wherein on a side facing toward a lifting cushion the bridge parts are shaped in accordance with a contour of the lifting cushion in its inflated state.

19. Lifting module for assembling a salvage system as claimed in claim 1, comprising an inflatable lifting cushion, at least one connecting collar, a number of first and second radial shackles and a number of axial shackles.

20. Lifting module as claimed in claim 19, wherein the axial shackles are provided in at least two different length dimensions.

21. Container comprising at least one lifting module as claimed in claim 19.

22. Aircraft lifting system comprising a cushion stack of successive inflatable lifting cushions mutually connected by cushion coupling means and assembled with the salvage system as claimed in claim 1.

23. Container comprising at least one lifting module as claimed in claim 20.

\* \* \* \* \*